United States Patent Office 3,635,956
Patented Jan. 18, 1972

3,635,956
BENZOTHIAZINES, RELATED COMPOUNDS, DERIVATIVES AND SALTS THEREOF
John Krapcho, Somerset, N.J., assignor to E. R. Squibb & Sons, Inc., New York, N.Y.
No Drawing. Filed Mar. 1, 1968, Ser. No. 709,808
Int. Cl. C07d 93/12
U.S. Cl. 260—240 K    12 Claims

ABSTRACT OF THE DISCLOSURE

This disclosure relates to compounds having the formula

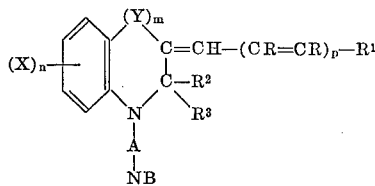

wherein X is hydrogen, halogen, trifluoromethyl, alkoxy, alkylthio, amino, dialkylamino, hydroxy, cyano or nitro; Y is O, S, sulfone ($SO_2$) or sulfoxide (SO); R is hydrogen or lower alkyl; R' is lower alkyl, X-substituted phenyl (e.g., 4-fluorophenyl; pentafluorophenyl, and so forth); 4 - phenylphenyl; piperonyl (3,4 - methylenedioxyphenyl); X-substituted thienyl; X-substituted furyl; pyridyl; X-substituted phenyl alkylene (e.g., benzyl, 4-chlorophenethyl); naphthyl; cycloalkyl (e.g., cyclopropyl; cyclobutyl, cyclohexyl, and so forth), cycloalkenyl (3-cyclohexenyl); polycyclic alkylene (e.g., adamantyl) and polycyclic alkenyl (e.g., 5-norbornenyl); $R^2$ and $R^3$ taken separately are each hydrogen, and taken together are oxo (O=); m is 0 or 1; p is 0 or 1; and n is 1 to 4; A is lower alkylene (e.g., from one to six carbons) and NB is a basic nitrogen containing radical; pharmaceutically acceptable salts thereof; and to processes for their preparation. Compounds having the above structure possess central nervous system depressant activity as well as antibacterial and disinfectant activity.

This invention relates to compounds having the Formula I

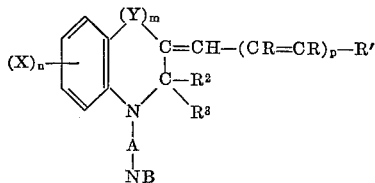

wherein X is hydrogen, halogen, trifluoromethyl, alkoxy, alkylthio, amino, dialkylamino, hydroxy, cyano or nitro; Y is O, S, sulfone ($SO_2$) or sulfoxide (SO); R is hydrogen or lower alkyl; R' is lower alkyl, X-substituted phenyl (e.g., 4-fluorophenyl; pentafluorophenyl, and so forth); 4-phenylphenyl; piperonyl (3,4-methylenedioxyphenyl); X-substituted thienyl; X-substituted furyl; pyridyl; X-substituted phenyl alkylene (e.g., benzyl, 4-chlorophenethyl); naphthyl; cycloalkyl (e.g., cyclopropyl, cyclobutyl, cyclohexyl, and so forth), cycloalkenyl (3-cyclohexenyl); polycyclicalkylene (e.g., adamantyl) and polycyclic alkenyl (e.g., 5-norbornenyl); $R^2$ and $R^3$ taken separately are each hydrogen, and taken together are oxo (O=); m is 0 or 1; p is 0 or 1; and n is 1 to 4; A is lower alkylene (e.g., from one to six carbons) and NB is a basic nitrogen containing radical; pharmaceutically acceptable salts thereof; and to processes for their preparation.

Among the suitable radicals represented by the symbol NB are: amino; (lower alkyl)amino; di(lower alkyl) amino;(hydroxy lower alkyl)amino; (hydroxy lower alkyl) (lower alkyl)amino; (e.g., N-2-hydroxyethyl-N-methylamino); di(hydroxy lower alkyl)amino; phenyl(lower alkyl)amino; N-phenyl lower alkyl(lower alkyl) amino; and saturated 5- to 7-membered monocyclic heterocyclic radicals of less than twelve carbon atoms, as exemplified by piperidino; (lower alkyl)piperidino; di(lower alkyl) piperidino; (lower alkoxy)piperidino; homopiperidino; 2,3- or 4-piperidyl; 2,3- or 4-(N-lower alkylpiperidyl); pyrrolidino; (lower alkyl)pyrrolidino; di(lower alkyl)pyrrolidino; (lower alkoxy)pyrrolidino; 2- or 3-pyrrolidyl; 2- or 3-(N-lower alkyl pyrrolidyl); morpholino; (lower alkyl)morpholino; di(lower alkyl)morpholino; (lower alkoxy)morpholino; thiamorpholino; (lower alkyl)thiamorpholino; di(lower) thiamorpholino; (lower alkoxy) thiamorpholino; piperazino; R-R-substituted piperazino (e.g., $N^4$-ethylpiperazino; $N^4$-phenylpiperazino, and so forth); [hydroxy (lower alkyl)]-piperazino [e.g., $N^4$-(2-hydroxyethyl)piperazino]; (lower alkyl)-piperazino (e.g., $N^4$-methylpiperazino); di(lower alkyl)piperazino; (lower alkoxy)piperazino; homopiperazino; and 4-R-substituted homopiperazino (e.g., $N^4$-benzylhomopiperazino).

The terms "lower alkyl," "lower alkoxy," and "lower alkylene," as employed herein, include both straight and branched chain radicals of less than eight carbon atoms, for example, methyl, ethyl, propyl, isopropyl, butyl, isobutyl, t-butyl, amyl, methoxy, ethoxy, propoxy, isopropoxy, ethylene, propylene, and the like.

The particularly preferred compounds are those wherein X is hydrogen, Y is sulfur and oxygen, p is 0, R is hydrogen, R' is phenyl or X-substituted phenyl, A is ethylene, NB is dilower alkyl amino and m is 1.

As to the salts, those coming within the purview of this invention include the acid-addition salts of those compounds containing a basic group particularly the non-toxic acid-addition salts and the non-toxic quaternary ammonium salts. Acids useful for preparing these acid-addition salts include, inter alia, inorganic acids, such as the hydrohalic acids (e.g., hydrochloric and hydrobromic acid), sulfuric acid, nitric acid, and phosphoric acid, and organic acids such as maleic, tartaric, citric, acetic, salicylic, succinic acid, theophylline, 8-chlorotheophylline, maleic, benzoic, nicotinic, methanesulfonic or cyclohexanesulfamic. The quaternary ammonium salts include those formed with alkyl halides (e.g., methyl chloride, isobutyl bromide, dodecyl chloride and cetyl iodide), benzyl halides (e.g., benzyl chloride) and dilower alkyl sulfates (e.g., dimethyl sulfate).

Compounds of this invention and the salts thereof possess central nervous system modifying activity, particularly as depressants and are therefore useful as tranquilizers. They may be administered orally or parenterally in the form of tablets, capsules, elixirs, injectables, or the like, by incorporating the appropriate dosage of the compound of Formula I or a physiologically acceptable salt thereof in a dosage range and in a manner similar to that used with chlordiazepoxide. In addition, the new compounds of the invention and the intermediates therefor in aqueous solution or suspension possess antibacterial activity and can be used as disinfectants against various staphylococci (e.g., Staphylococci aureus). For this purpose they are disolved or suspended in water, preferably also containing a detergent, at a concentration of about 0.5% to about 5% and may be used as washes to disinfect walls and floors.

The thia compounds coming within the purview of this invention can be prepared by reacting a 2-aminobenzenethiol of the Formula II:

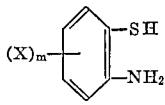
II wherein X and *m* are as defined above with chloroacetic acid to form a compound having Formula III

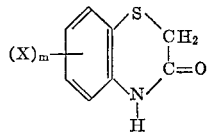
III

This lactam is then reacted with an aldehyde of the formula:

R'—(CR=CR)$_p$—CHO wherein R, R' and *p* are as defined above, in the presence of acetic anhydride and an organic amine, e.g., triethyl amine, tributyl amine, and so forth; to yield a compound having the Formula IV

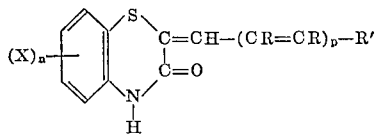
IV wherein R, R', X, *n* and *p* are as defined hereinabove.

The compound of Formula IV is then reacted in an inert solvent, such as toluene, in the presence of a base such as sodamide, sodium hydride, potassium butoxide, powdered sodium hydroxide, and the like, with a basic halide of the formula:

Hal—A—NB wherein Hal is halogen, e.g., chloro or bromo and A and NB are as defined above, to yield the new compounds of the instant invention having Formula V

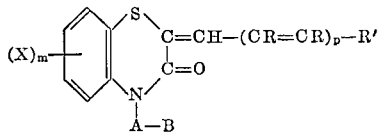
V wherein R, R¹, X, A, B, *m* and *p* are as defined above.

The corresponding sulfones and sulfoxides derivatives of Formula I may then be prepared by oxidizing compounds of Formula V wherein Y is S with equivalent quantities of potassium permanganate, hydrogen peroxide, m-chloroperbenzoic acid, periodic acid and similar reagents.

Although the above procedure may be utilized in the preparation of compounds related to the thia compounds, it is preferred to follow a different procedure in preparing the oxo containing and indolinone compounds of this invention. In such instances a nitro compound of formula:

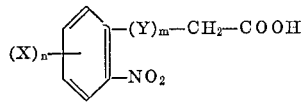
VI wherein X, Y, *m* and *n* are as defined herein is treated with a reducing agent, for example, hydrogen or sodium hydrosulfide to cyclize Compound VI and form compound:

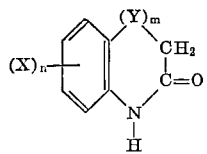
VII

This latter compound is then worked up in a manner similar to that for a compound of Formula III to yield the end product of Formula

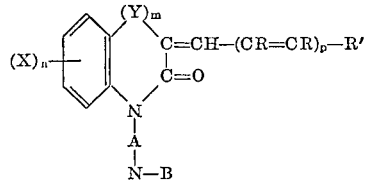
VIII wherein R, R', X, Y, *m*, *n* and *p* are as described herein.

The compounds of Formula VIII may be reduced by treatment with a reducing agent such as lithium aluminum hydride or diborane to produce products of this invention of Formula I wherein R³ and R⁴ are each hydrogen. It is to be understood that in the reduced form, as well as its carbonyl predecessor, each has the activity disclosed herein.

Examples of starting materials of Formula II are:

2-aminobenzenethiol;
4-t-butyl-2-aminobenzenethiol;
3-heptyl-2-aminobenzenethiol;
4-ethoxy-2-aminobenzenethiol;
3,4-dichloro-2-aminobenzenethiol;
4-ethylthio-2-aminobenzenethiol;
6-trifluoromethyl-2-aminobenzenethiol;
5-methoxy-2-aminobenzenethiol;
4-dimethylamino-2-aminobenzenethiol;
3,4-dimethoxy-2-aminobenzenethiol;
4-cyano-2-aminobenzenethiol; and
6-nitro-2-aminobenzenethiol.

In addition, examples of compounds of Formula VI are:

2-nitrophenoxyacetic acid;
4-chloro-2-nitrophenoxyacetic acid;
4-t-butyl-2-nitrophenoxyacetic acid;
3-iodo-4-bromo-2-nitrophenoxyacetic acid;
4-ethylthio-2-nitrophenoxyacetic acid;
4-trifluoromethyl-2-nitro-phenoxyacetic acid;
3-methoxy-2-nitrophenoxyacetic acid;
3-methyl-4-ethyl-2-nitrophenoxyacetic acid;
2-nitrophenylacetic acid;
3-chloro-2-nitrophenylacetic acid;
3-isopropl-2-nitrophenylacetic acid;
4-bromo-2-nitrophenylacetic acid;
4-ethylthio-2-nitrophenylacetic acid;
5-fluoro-2-nitrophenylacetic acid; and
3-heptyl-2-nitrophenylacetic acid.

Examples of aldehydes that can be utilized in the practice of the invention are:

acetaldehyde;
propionaldehyde;
butyraldehyde;
benzaldehyde;
2-chlorobenzaldehyde;
4-tolualdehyde;
3-trifluoromethylbenzaldehyde;
4-nitrobenzaldehyde;
4-butoxybenzaldehyde;
3-methylthiobenzaldehyde;
4-dimethylaminobenzaldehyde;
2,4-dibromobenzaldehyde;
4-chloro-3-nitrobenzaldehyde;
2-bromo-4-chlorobenzaldehyde;
4-methoxybenzaldehyde;
2,3,4,5,6-pentafluorobenzaldehyde;
4-phenylbenzaldehyde;
3,4-methylenedioxybenzaldehyde,
5-bromothiophenecarboxaldehyde;
5-nitrofurfuraldehyde;
2-pyridinecarboxaldehyde,
3-pyridinecarboxaldehyde,
4-pyridinecarboxyaldehyde;

phenylacetaldehyde,
β-phenylpropionaldehyde;
4-chlorophenylacetaldehyde;
1-naphthaldehyde;
cyclopropylcarboxaldehyde;
cyclohexanecarboxaldehyde;
3-cyclohexenecarboxaldehyde;
1-adamantanecarboxaldehyde;
5-norbornene-2-carboxaldehyde;
crotonaldehyde,
cinnamaldehyde,
α-methylcinnamaldehyde,
α-propylcinnamaldehyde,
4-chlorocinnamaldehyde; and
β-methylcinnamaldehyde.

Alternatively, to prepare compounds of Formula V it is preferred to react compounds of Formula IV with a dihalide of the formula:

wherein Hal is halogen (e.g., chloro or bromo) to yield a compound of Formula IX:

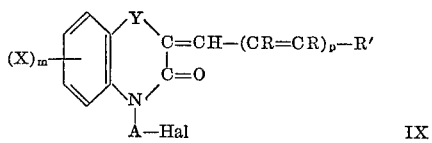

wherein R, R', X, R, Hal, m, n and p are as defined herein.

This halide can then be reacted with an amino of the formula:

where NB is defined as above in an inert solvent (e.g., benzene and toluene) to form the compounds of Formula V.

Another alternate synthesis utilities the interaction of Formula III with Hal—A—NB to give compounds of the Formula X

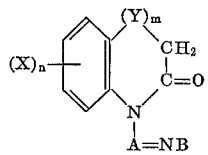

wherein A, X, Y, NB and n are as defined herein.
This material is heated with an aldehyde of the formula:

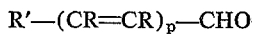

wherein R, R' and p are as defined above to yield the compound of Formula V.

To form the acid-addition salts or the quaternary ammonium salts, the free base initially formed is interacted with at least one equivalent of the desired acid or quaternary ammonium hydrocarbon halide.

The nitro derivatives of the instant invention, wherein X is nitro, may be prepared by reacting compound V with fuming nitric acid. The product recovered may then be reduced to form an amino derivative. The hydroxy derivative of compound V may be formed by reacting a compound wherein X is alkoxy with concentrated hydrochloric acid or with pyridine hydrochloride.

The following examples illustrate the invention, all temperatures are in degrees centigrade unless otherwise stated:

EXAMPLE 1

Benzylidene-4(2-dimethylaminoethyl)-2H-1,4-benzothiazin-3(4H)-one, hydrochloride (a) 1,4-benzothiazin-3-one.—A stirred solution of 250 g. of 2-aminobenzenethiol in 500 ml. of toluene is treated with a solution of 95 g. of chloroacetic acid in 300 ml. of toluene. The mixture is heated and then refluxed for three hours to give a heavy yellow slurry. After cooling to about 20° C., the product is filtered and air-dried. This solid (250 g.) is suspended in 1 l. of water, filtered and washed with 100 ml. of cold acetonitrile (twice) to remove some of the yellow color. The nearly colorless product weighs 117 g. (71%) M.P. 179–181° (s. 176°). After crystallization of 96.0 g. of this material from 100 ml. DMF–300 ml. of CH₃CN, the colorless material weighs 85.7 g. (64%); M.P. 179–181°.

(b) 2-benzylidene - 2H - 1,4 - benzothiazin - 3(4H)-one.—A mixture of 45.0 g. (0.18 mole) of the above material, 45.0 g. (0.42 mole) of benzaldehyde and 100 ml. of acetic anhydride is heated and the resulting solution treated with 50 ml. of triethylamine. This mixture is heated and the solution refluxed for seven hours. The dark solution becomes a crystalline mass on cooling to about 20° C. and is added to 1 l. of ice-water. After standing for about twelve hours, the aqueous phase is decanted and the brown semi-solid triturated with cold water and filtered. This product is triturated with 100 ml. of 95% ethanol, cooled and filtered to give 51.0 g. (74%) of yellow crystalline material, M.P. 198–203°. Crystallization from 100 ml. DMF–200 ml. of ethanol gives 46.8 g. (68%) of yellow crystalline material, M.P. 203–205°. A sample crystallized from DMF melts at 204–205°.

(c) 2 - benzylidene - 4 - (2 - dimethylaminoethyl) - 2H-1,4-benzothiazin-3(4H)-one, hydrochloride.—To a suspension of 4.0 g. (0.1 mole) of NaNH₂ in 1 l. of toluene is added to 25.4 g. (0.1 mole) of the above material. The solid dissolves to give a yellow solution. A solution of 2-dimethylaminoethyl bromide (0.15 mole) in 200 ml. of toluene (dried over MgSO₄) is added—stirred for thirty minutes at room temperature and then at 60–65° for four hours. The mixture is cooled, treated with 200 ml. of water and the layers separated. The product is extracted from the organic phase with dilute acid and the acid solution neutralized with sodium hydroxide to give 23.6 g. of the base as a yellow-orange oil. The latter yields 24.0 g. (67%) of the yellow hydrochloride salt, M.P. 229–232°. After crystallization from 450 ml. of ethanol, the yellow product weighs 20.2 g. (56%); M.P. 234–236°.

EXAMPLE 2

2-benzylidene-4-(3-dimethylaminopropyl)-2H-1,4-benzothiazin-3(4H)-one, hydrochloride Interaction of 25.4 g. (0.1 mole) of 2-benzylidene-2H-1,4-benzothiazin-3(4H)-one, 4.0 g. (0.1 mole) of NaNH₂ and toluene solution of 0.16 mole of 3-dimethylaminopropyl bromide in 1 l. of toluene in the same manner as described under Example 1(c) gives 28.7 g. of free base as yellow-orange syrup. The latter gives 27.3 g. (73%) of the yellow hydrochloride salt, M.P. 189–191°. Crystallization from 100 ml. of ethanol gives 26.2 g. (70%) of yellow product, M.P. 191–193°.

EXAMPLE 3

2-benzylidene-4-(2-diethylamino)-2H-1,4-benzothiazin-3(4H)-one, hydrochloride

A mixture of 50.8 g. of 2-benzylidene-2H-1,4-benzothiazin-3(4H)-one with 8.0 g. of sodamide and 41 g. of 2-diethylaminoethyl chloride in 2 l. of toluene is stirred and refluxed for four hours. The product is isolated in the same manner as in Part (c) of Example 1 to give 53.2 g. of the product, M.P. 163–166°. Crystallization from 75 ml. of acetonitrile gives 38.4 g. of pale yellow material, M.P. 168–170°. Following recrystallization from 60 ml. of acetonitrile, the pale yellow product weighs 35.8 g., M.P. 169–171°.

EXAMPLE 4

4-(2-dimethylaminoethyl)-2-cinnamylidene-2H-1,4-benzothiazin-3(4H)-one, hydrochloride (a) 2 - cinnamylidene - 2H - 1,4 - benzothiazin - 3(4H)-one.—A mixture of 50.0 g. of material from Example 1(a) 50 g. of cinnamaldehyde, 150 ml. of acetic anhydride and 50 ml. of triethylamine is heated. After refluxing the resulting solution for about one hour, the crystalline product separates. The mixture is refluxed for a total of four hours, cooled to room temperature, filtered and washed with acetic acid and acetonitrile to give 49.7 g. of yellow-orange product, M.P. 265—268°. After recrystallization from 200 ml. of dimethylformamide, the yellow-orange material weighs 44.2 g., M.P. 268–270°.

(b) 4 - (2 - dimethylaminoethyl) - 2 - cinnamylidene-2H-1,4-benzothiazin-3(4H)-one, hydrochloride.—A suspension of 28.0 g. of material from Part (a) and 4.0 g. of sodamide in 1 l. of toluene is stirred and heated to 70°. The resulting slurry is cooled to 40°, treated with a toluene solution of 23.0 g. of 2-dimethylaminoethyl bromide and the mixture is stirred an refluxed for four hours. The product is isolated in the manner described in the preparation of Example 1 Part (c) to give 21.2 g. of the yellow hydrochloride salt, M.P. 226–231°. After recrystallization from 1 l. of ethanol, the yellow crystalline materialweighs 18.6 g., M.P. 234–236°.

EXAMPLE 5

4-(2-morpholinoethyl)-2-cinnamylidene-2H-1,4-benzothiazin-3(4H)-one, hydrochloride Utilizing the procedure of Part (b) of Example 4 but substituting an equivalent quantity of 2-morpholinoethyl chloride for the 2-dimethylaminoethyl bromide, 4-(2-morpholinoethyl) - 2 - cinnamylidene - 2H - 1,4 - benzothiazin-3(4H)-one, hydrochloride is obtained.

EXAMPLE 6

4-(2-dimethylaminoethyl)-2α-methylcinnamylidene-2H-1,4-benzothiazin-3(4H)-one, hydrochloride Utilizing the procedure of Example 4 but substituting an equivalent quantity of α-methylcinnamaldehyde for the cinnamaldehyde in Part (a), the product, 4-(2-dimethylaminoethyl) - 2 - α - methylcinnamylidene - 2H - 1,4-benzothiazin-3(4H)-one, hydrochloride, is obtained.

EXAMPLE 7

6 - chloro - 4 - (2-dimethylaminoethyl)-2-(3-nitrobenzylidene)-2H-1,4-benzothiazin-3(4H)-one, hydrochloride Following the procedure in Example 1 but substituting 2-amino-4-chlorobenzenethiol for 2-aminobenzenethiol in Part (a) and 3-nitrobenzaldehyde for the benzaldehyde in Part (b), the compound, 6-chloro-4-(2-dimethylaminoethyl) - 2 - (3 - nitrobenzylidene) - 2H - 1,4 - benzothiazin-3(4H)-one, hydrochloride, is obtained.

EXAMPLE 8

2-(4-dimethylaminobenzylidene)-4 - (2 - dimethylaminoethyl-7-methyl-2H-1,4-benzothiazin-3(4H)-one, hydrochloride Following the procedure of Example 1 but substituting 2-amino-5-methylbenzenethiol for 2-aminobenzenethiol in Part (a) and 4-dimethylaminobenzaldehyde for the benzaldehyde in Part (b), the compounds, 2-(4-dimethylaminobenzylidene)-4-(2-dimethylaminoethyl) - 7 - methyl-2H-1,4-benzothiazin-3(4H)-one, hydrochloride, is obtained.

EXAMPLE 9

4 -[3 - (4 - methylpiperazino)propyl] - 2 - (2,3,4,5,6 - pentafluorobenzylidene) - 2H - 1,4 - benzothiazin - 3(4H)-one, hydrochloride Following the procedure of Example 1 but substituting 2,3,4,5,6-pentafluorobenzaldehyde for benzaldehyde in Part (b) and 3-(4-methylpiperazino)propyl chloride for 2-dimethylaminoethyl bromide in Part (c), the compound, 4 - [3 - (4-methylpiperazino)propyl]-2-(2,3,4,5,6-pentafluorobenzylidene) - 2H-1,4 - benzothiazin - 3(4H)-one, hydrochloride, is obtained.

EXAMPLE 10

2-furylidene-4-(2-piperidinoethyl)-2H-1-,4-benzothiazin-3(4H)-one, hydrochloride Following the procedure of Example 1 but substituting furfuraldehyde for benzaldehyde in Part (b) and 2-piperidinoethyl chloride for 2-dimethylaminoethyl bromide in Part (c), the compound, 2-furylidene-4-(2-piperidinoethyl)-2H-1,4-benzothiazin-3(4H)-one, hydrochloride, is obtained.

EXAMPLE 11

2 - cyclohexylmethylene - 4 - (2 - dimethylaminoethyl) - 6-trifluoromethyl - 2H - 1,4 - benzothiazin - 3(4H) - one, hydrochloride Following the procedure of Example 1 but substituting 4-trifluoromethyl-2-aminobenzenethiol for 2-aminobenzenethiol in Part (a) and cyclohexanecarboxaldehyde for benzaldehyde in Part (b), the compound, 2-cyclohexylmethylene - 4 - (2 - dimethylaminoethyl) - 6 - trifluoromethyl-2H-1,4-benzothiazin-3(4H)-one, hydrochloride, is obtained.

EXAMPLE 12

2-butenylidene-4-(2-dimethylaminoethyl)-2H-1,4-benzothiazin-3-(4H)-one, hydrochloride Following the procedure of Example 1 but substituting crotonaldehyde for benzaldehyde in Part (b), the compound 2 - butenylidene-4-(2-dimethylaminoethyl)-2H-1,4-benzothiazin-3-(4H)-one, hydrochloride, is obtained.

EXAMPLE 13

2-benzylidene-4-(2-dimethylaminoethyl)-2H-1,4-benzoxazin-3(4H)-one, hydrochloride Following the procedure in Example 1 Part (c) but substituting 2-benzylidene-2H-1,4-benzoxazin -3 (H) - one (prepared by heating 1,4-benzoxazin-3-one with benzaldehyde) for the 2-benzylidene-2H-1,4-benzthiazin-3(4H)-one, the compound, 2-benzylidene-4-(2-dimethylaminoethyl)-2H-1,4-benzoxazin-3(4H)-one, hydrochloride, is obtained.

EXAMPLE 14

3-benzylidene-1-(2-dimethylaminoethyl)-2-indolinone, hydrochloride

Following the procedure in Example 1, Part (c) but substituting 3-benzylidene-2-indolinone (prepared by heating oxindole with benzaldehyde) for the 2-benzylidene-2H-1,4-benzothiazin-3(4H)-one, the compound, 3-benzylidene-1-(2-dimethylaminoethyl) - 2 - indolinone, hydrochloride, is obtained.

EXAMPLE 15

2-benzylidene-4-(2-diethylaminoethyl)-3,4-dihydro-2H-1,4-benzothiazine

The material from Example 3 (8.3 g.) is treated with aqueous potassium carbonate to give 7.7 g. of free base. The latter is dissolved in 50 ml. of tetrahydrofuran, added to a stirred suspension of 2 g. of lithium aluminum hydride in 200 ml. of tetrahydrofuran and the mixture refluxed for seven hours. After cooling, the slurry is treated with 3 ml. of water and 1 g. of sodium hydroxide in 5 ml. of water. This mixture is diluted with 500 ml. of ether, dried over magnesium sulfate and filtered. Evaporation of the filtrate gives 6.5 g. of product.

Similarly, by following the procedure of Example 1 Part (a) but substituting the indicated 2-aminobenzenethiol in lieu of 2-aminobenzenethiol, the designated 2-benzylidene - 4 - [3 - (dimethylamino)propyl]-2H-1,4-benzothiazin-3(4H)-one, hydrochloride, is obtained.

| Ex. | Reactant | Product |
|---|---|---|
| 16 | 4-t-butyl-2-aminobenzenethiol | 6-t-butyl. |
| 17 | 3-heptyl-2-aminobenzenethiol | 5-heptyl. |
| 18 | 4-ethoxy-2-aminobenzenethiol | 6-ethoxy. |
| 19 | 4-ethylthia-2-aminobenzenethiol | 6-ethylthia. |
| 20 | 3,4-dimethoxy-2-aminobenzenethiol | 5,6-dimethoxy. |
| 21 | 3-chloro-4-bromo-2-aminobenzenethiol | 5-chloro-6-bromo. |
| 22 | 4-cyano-2-aminobenzenethiol | 6-cyano. |
| 23 | 6-nitro-2-aminobenzenethiol | 8-nitro. |

EXAMPLE 24

2-benzylidene-4-(2-dimethylaminoethyl)-2H-1,4-benzothiazin-3(4H)-one-1,1-dioxide By treatment of the free base of Example 1 with excess potassium permanganate, the desired product is obtained.

EXAMPLE 25

2-benzylidene-4-(2-dimethylaminoethyl)-2H-1,4-benzothiazin-3(4H)-one, methobromide Treating the free base of Example 1 with methylbromide in the presence of acetonitrile will yield the desired product.

EXAMPLE 26

2-benzylidene-4-(2-dimethylaminoethyl)-2H-1,4-benzothiazin-3(4H)-one-1-oxide

To a solution of hydrogen peroxide 2-benzylidene-4-(2-dimethylaminoethyl)-2H-1,4 - benzothiazin-3(4H)-one is added and the product recovered is 2-benzylidene-4-(2-dimethylaminoethyl) - 2H - 1,4 - benzothiazin-3(4H)-one-1-oxide.

EXAMPLE 27

2-naphthylidene-4-(2-dimethylaminoethyl)-2H-1,4-benzothiazin-3(4H)-one, hydrochloride Following the procedure of Example 1, but substituting 1-naphthaldehyde for benzaldehyde in Part (b), the compound, 2-naphthylidene - 4 - (2-dimethylaminoethyl)-2H-1,4-benzothiazin-3(4H)-one, hydrochloride, is obtained.

EXAMPLE 28

2-ethylidene-4-(2-dimethylaminoethyl)-2H-1,4-benzothiazin-3(4H)-one, hydrochloride Following the procedure of Example 1 but substituting acetaldehyde for the benzaldehyde in Part (b), the compound, 2-ethylidene - 4 - (2-dimethylaminoethyl)-2H-1,4-benzothiazin-3(4H)-one, hydrochloride, is obtained.

EXAMPLES 29 AND 30

By treatment of the nitro compound of Example 7 with stannous chloride and 6-ethoxy compound of Example 18 with pyridine hydrochloride, the corresponding amino and hydroxy analogs were obtained.

The invention may be variously otherwise embodied within the scope of the appended claims.

What is claimed is:

1. A compound of the formula:

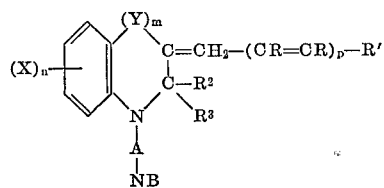

wherein X is hydrogen, halogen, trifluoromethyl, lower alkoxy, lower alkylthio, amino, di-(lower alkyl)amino, hydroxy, cyano or nitro, Y is O, S, sulfone ($SO_2$) or sulfoxide (SO); R is hydrogen or lower alkyl; R' is lower alkyl, X-substituted phenyl; 4-phenylphenyl; piperonyl; 3,4-methylenedioxyphenyl; X-substituted thienyl, X-substituted furyl; 2-, 3-, or 4-pyridyl; X-substituted benzyl or phenethyl; naphthyl; cyclopropyl; cyclobutyl; cyclohexyl; and 3-cyclohexenyl; $R^2$ and $R^3$ taken separately are each hydrogen, and taken together are oxo (O=); $m$ is 0 or 1; P is 0 or 1; and $n$ is 1 to 4; A is lower alkylene and NB is a basic nitrogen containing radical selected from the group consisting of amino; (lower alkyl)amino; di-(lower alkyl)amino; (hydroxy lower alkyl)amino; (hydroxy lower alkyl) (lower alkyl)amino; di(hydroxy lower alkyl)amino; phenyl(lower alkyl)amino; N-phenyl lower alkyl(lower alkyl)amino; piperidino; (lower alkyl)piperidino; di(lower alkyl)piperidino; (lower alkoxy)piperidino; homopiperidino; pyrrolidino; (lower alkyl)pyrrolidino; di(lower alkyl)pyrrolidino; (lower alkoxy)pyrrolidino; morpholino; (lower alkyl)morpholino; di(lower alkyl)morpholino; (lower alkoxy)morpholino; thiamorpholino; (lower alkyl)thiamorpholino; di(lower alkyl)thiamorpholino; (lower alkoxy)thiamorpholino; piperazino; (lower alkyl)piperazino; di(lower alkyl)piperazino; (lower alkoxy)piperazino; homopiperazino; and 4-R-substituted homopiperazino; or a pharmaceutically acceptable salt thereof.

2. A compound having the formula

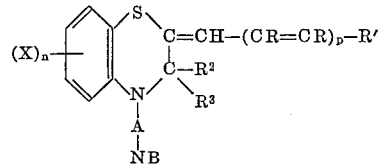

wherein R, R', $R^2$, $R^3$, X, A, NB, $n$ and $p$ are as defined in claim 1.

3. A pharmaceutically acceptable salt of the compound of claim 2.

4. A compound having the formula

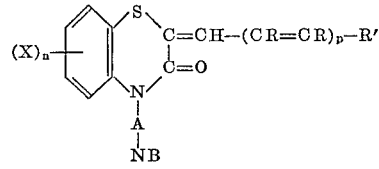

wherein R, R', A, NB, X, $n$ and $p$ are as described in claim 1.

5. A compound having the formula

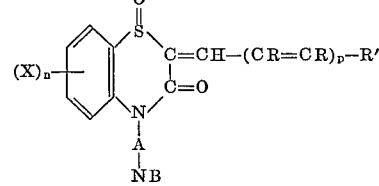

wherein R, R', A, NB, X, $n$ and $p$ are as defined in claim 1.

6. A compound having the formula

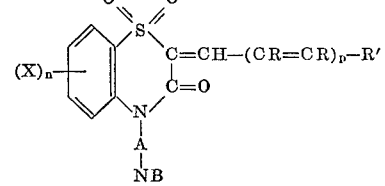

wherein R, R', A, NB, X, $m$ and $p$ are as defined in claim 1.

7. A compound of the formula

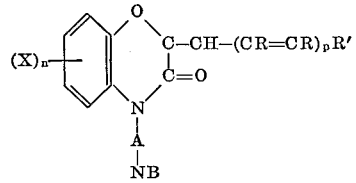

wherein R, R', A, NB, X, $n$ and $p$ are as defined in claim 1.

8. A compound in accordance with claim 1 having the structure:

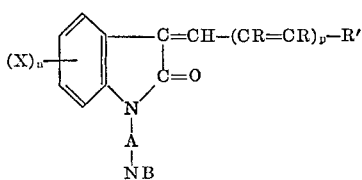

wherein R, R', X, a, NB, n and p are as defined in claim 1.

9. A compound in accordance with claim 1 having the name 2-benzylidene - 4-(3-dimethylaminopropyl)-2H-1,4-benzothiazin-3(4H)-one, hydrochloride.

10. A compound in accordance with claim 1 having the name 2-benzylidene - 4 - (2 - diethylaminoethyl)-2H-1,4-benzothiazin-3(4H)-one, hydrochloride.

11. A compound in accordance with claim 1 having the name 4-(2-dimethylaminoethyl)-2-cinnamylidene-2H-1,4-benzothiazin-3(4H)-one, hydrochloride.

12. A compound in accordance with claim 1 having the name 2-benzylidene - 4 - (2-diethylaminoethyl)-3,4-dihydro-2H-1,4-benzothiazine.

References Cited

UNITED STATES PATENTS 2,622,980    12/1952    Copeland _____ 260—240 X

FOREIGN PATENTS 395,096    12/1965    Switzerland _____ 260—243

HENRY R. JILES, Primary Examiner

S. D. WINTERS, Assistant Examiner

U.S. Cl. X.R.

260—240 R, 240 E, 240 F, 243 R, 244 R, 293 D3, 294 AC, 247.2 A, 247.5 B, 268 BC, 243 B, 326.11, 294 S, 293.4 A, 247.1, 578, 577, 465 E, 515 R, 516, 521

PO-1050
(5/69)

UNITED STATES PATENT OFFICE
CERTIFICATE OF CORRECTION

Patent No. 3,635,956      Dated January 18, 1972

Inventor(s) John Krapcho

It is certified that error appears in the above-identified patent and that said Letters Patent are hereby corrected as shown below:

Column 2, line 22 -- "R-R-" should read: -- 4-R --.

Column 3, line 48 -- "$R_1$" should read: -- R --.

Column 4, line 45 -- "isopropl" should read: -- isopropyl --.

Column 5, line 29 -- "X, R," should read: -- X, Y--.

Column 8, line 39 -- "3(H)" should read: -- 3(4H) --.

Signed and sealed this 20th day of June 1972.

(SEAL)
Attest:

EDWARD M. FLETCHER, JR.    ROBERT GOTTSCHALK
Attesting Officer    Commissioner of Patents